March 16, 1971 M. BEAURAIN 3,570,830
FURNACE FOR THE CONTINUOUS TREATMENT OF
PULVERIZED OR GRANULAR MATERIALS
Filed June 3, 1969 4 Sheets-Sheet 1

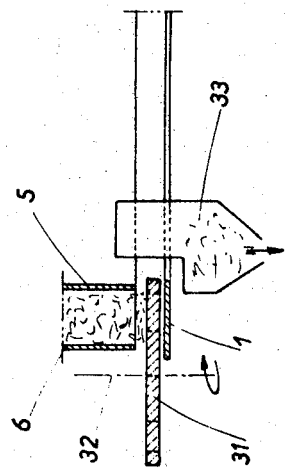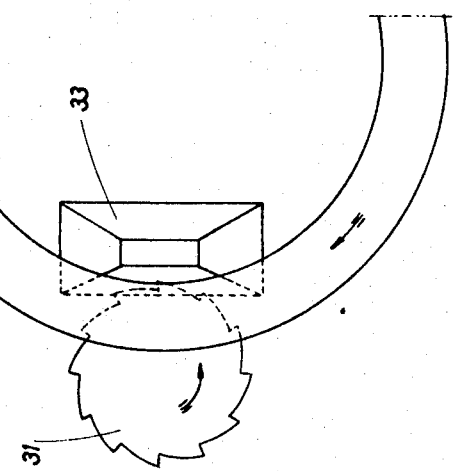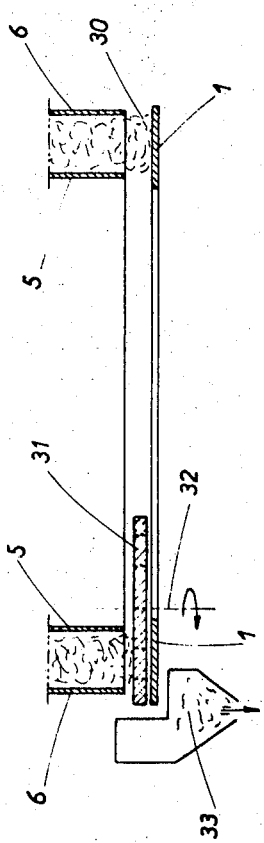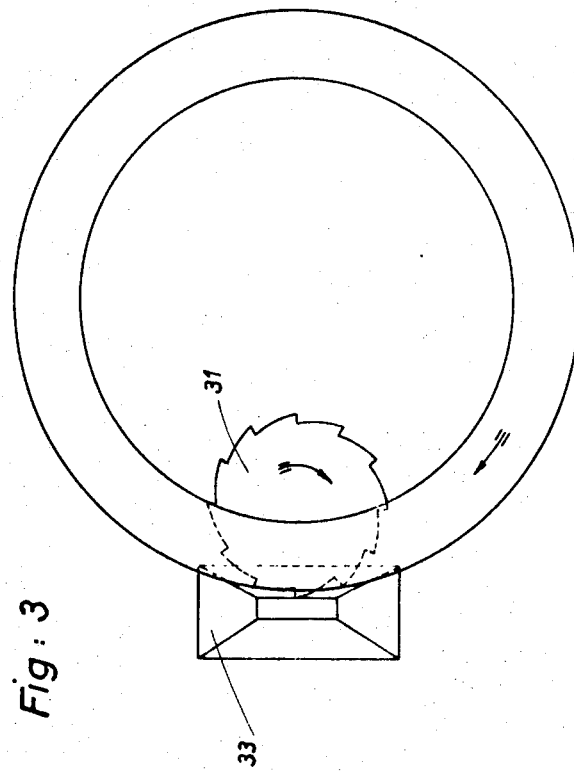

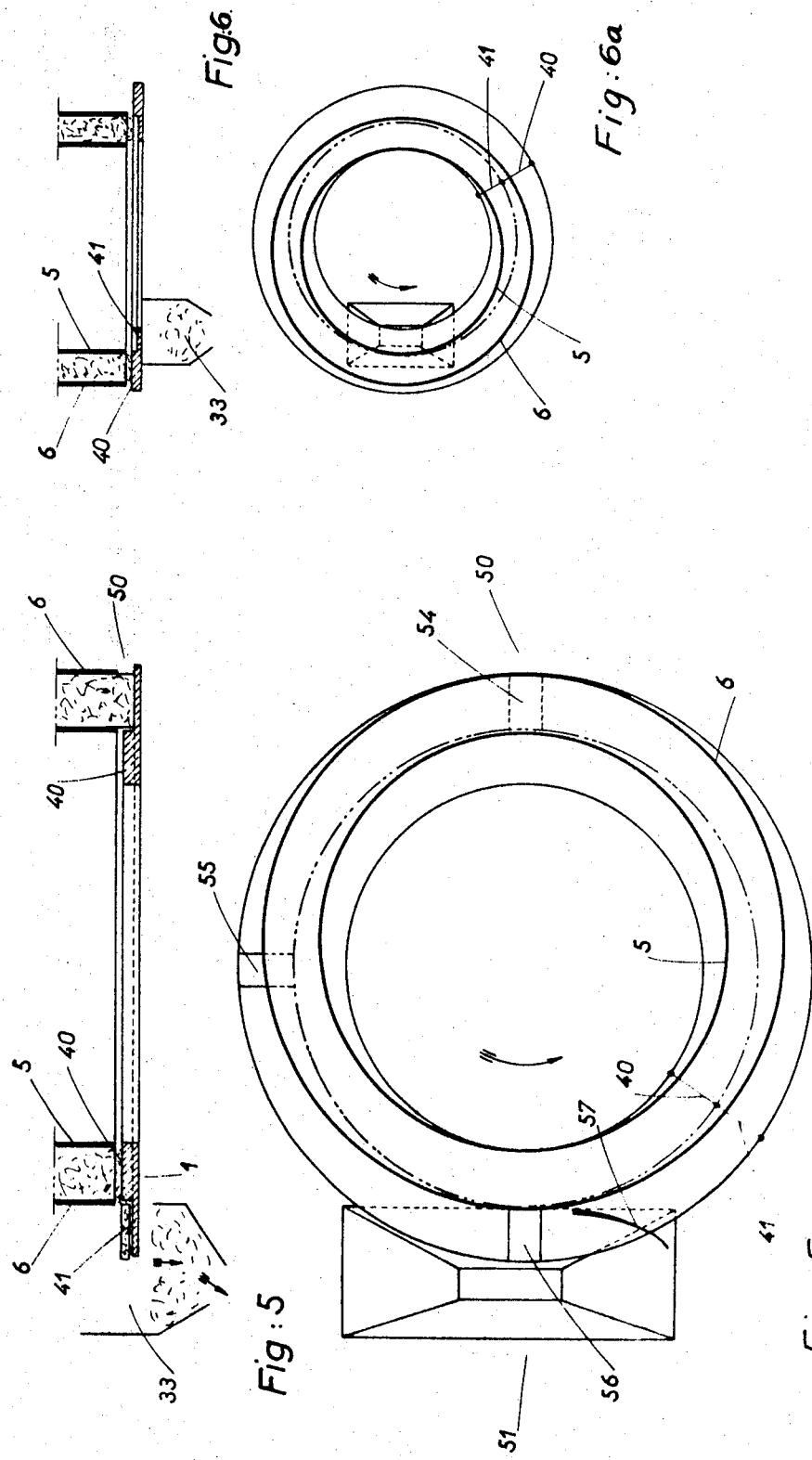

United States Patent Office

3,570,830
FURNACE FOR THE CONTINUOUS TREATMENT OF PULVERIZED OR GRANULAR MATERIALS
Michel Beaurain, Paris, France, assignor to Sestig, Courbovoie, France
Filed June 3, 1969, Ser. No. 830,061
Claims priority, application France, June 6, 1968, 154,035
Int. Cl. F27b 21/00
U.S. Cl. 266—20     3 Claims

ABSTRACT OF THE DISCLOSURE

An annular rotary furnace has spaced interior and exterior cylindrical walls and an annular rotary sole beneath the walls. The walls and sole are rotated synchronously. A stationary cap is mounted above the walls with a gas tight seal therebetween. Materials to be treated are introduced through the cap into the funace and are removed after treatment between the sole and the bottoms of the walls.

BACKGROUND OF THE INVENTION

The present invention relates to a furnace for the continuous treatment of pulverized or granular materials and more particularly for the agglomeration of iron minerals.

In known furnaces for agglomeration of minerals on a grid, large losses of heat occur. In these furnaces, combustion is carried out in the upper part of the charge and is extended by the aspiration of a current of gasses toward the base of the furnace until combustion occurs in the lower portions of the charge. The resulting gases and fumes are then removed from the furnace, after having passed through the layers of minerals undergoing combustion and these gases and fumes carry off a large amount of heat calories as sensible heat. The treated minerals are removed after combustion with the lower layers thereof still at a temperature adjacent that of combustion with consequent loss of a large amount of caloric heat as sensible heat. It has been established that about 40% of the caloric heat produced in the furnace is lost as sensible heat in the removed solid and gaseous products.

The present invention provides a furnace in which the agglomerated materials and the gases and fumes are relatively cold when removed from the furnace thus reducing substantially the losses of caloric heat and may generally be described metallurgical apparatus in the art including such patents as Nos. 2,696,432; 3,365,339; and 3,370,937.

SUMMARY OF THE INVENTION

In accordance with the present invention, the materials to be treated are introduced continuously into a rotary annular furnace having an annular sole rotated about a vertical axis, an annular furnace body, having substantially cylindrical walls, disposed above the sole and rotated around the vertical axis in synchronism with the sole. The furnace also has a fixed annular cap attached to the body of the furnace by a gas tight joint with provisions in the cap for charging the materials to be treated into the furnace and with provisions in the cap for the ascending circulation of the gases. The furnace also includes apparatus for the removal of the treated materials.

BRIEF DESCRIPTION OF THE DRAWINGS

The preferred embodiment of the present invention will be described in detail hereinafter with reference to the accompanying drawings, in which like reference characters indicate like parts. In these drawings.

FIG. 3 shows in partial vertical section one embodiment of apparatus for removal of the treated materials by a toothed wheel with the wheel disposed to remove the treated materials for the exterior of the rotary furnace;

FIG. 3a is a view from above of the embodiment of FIG. 3;

FIG. 4 is a partial vertical section of a variation of the structure of FIG. 3 in which the treated materials are removed toward the interior of the rotary furnace;

FIG. 4a is a view from above of the embodiment of FIG. 4;

FIG. 5 shows in partial vertical section another preferred means for removal of the treated material from the furnace by a two level sole with the treated material removed toward the exterior of the rotary furnace;

FIG. 5a is a view from above of the embodiment of FIG. 5;

FIG. 6 is a vertical sectional view of a variation of structure of FIG. 5 in which the treated material is removed toward the interior of the rotary furnace; and FIG. 6a is a view from above of the embodiment of FIG. 6.

DESCRIPTION OF THE PREFERRED EMBODIMENTS

Figure 1:
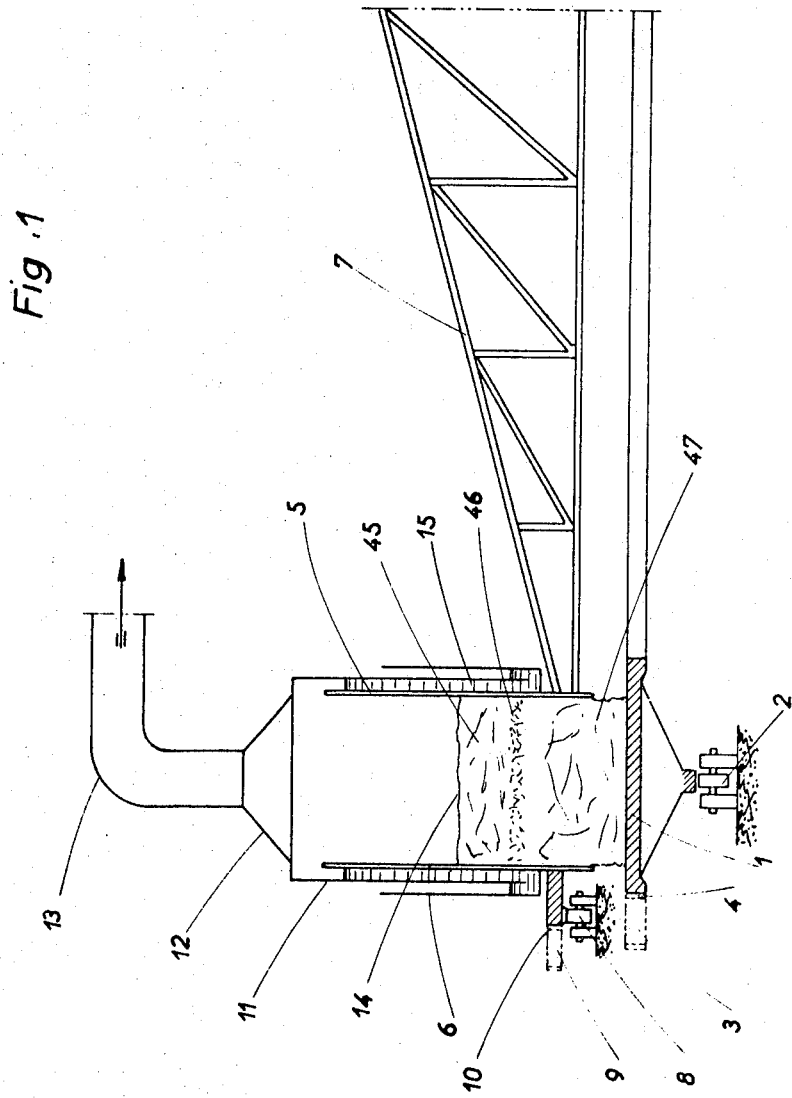
FIG. 1 is a schematic representation of a preferred embodiment of the present concept in vertical section showing an annular rotary furnace but not including the means for charging the materials to be treated into the furnace nor the means for removal of the treated material.

Referring now to FIG. 1, the furnace includes an annular sole 1 mounted on rollers 2 and rotated by a pinion 3 which engages an exterior toothed ring 4 on the sole.

The body of the furnace is made up of two cylindrical interior and exterior walls 5 and 6 supported by a suitable number of radial arms 7 and by support rollers 8. The body of the furnace is rotated by a pinion 9 which engages a toothed exterior ring 10 on wall 5.

An annular fixed cap 11 includes aspiration ducts 12 connected by piping 13 to a ventilator to create a current of gas from the bottom toward the top of the furnace through the material 14 to be treated. A gas tight joint between cap 11 and the walls 5 and 6 of the body of the furnace is provided by a hydraulic joint 15.

Figure 2:
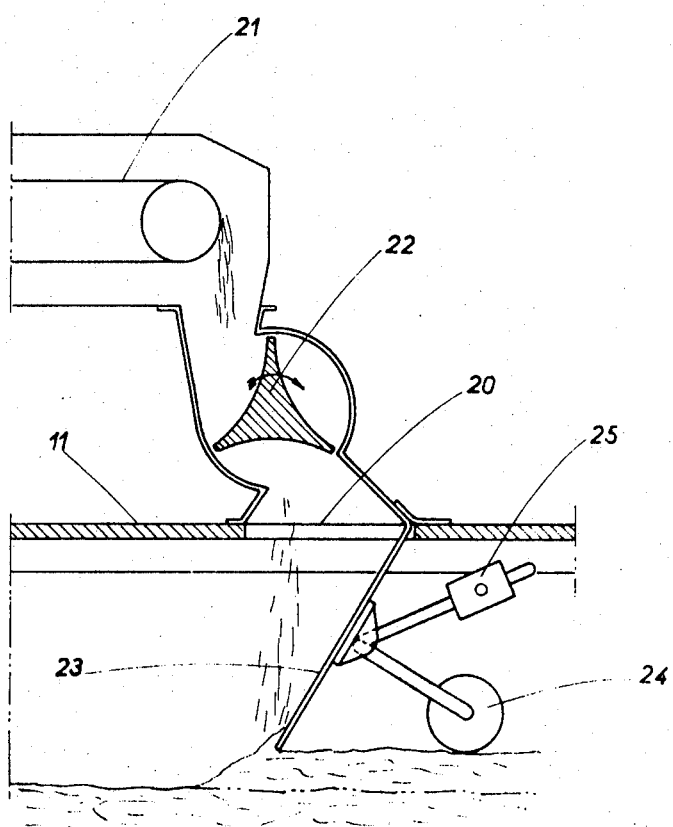
FIG. 2 shows a preferred means for continuous feed of the materials to be treated into the upper part of the furnace of FIG. 1.

Referring now to FIG. 2, an opening 20 is provided in the annular cap 11 for feed into the furnace of the crude materials to be treated. The materials to be treated are brought in by a conveyor belt 21 and are introduced into the furnace through the pockets of a rotary feeding device 22 which provides a uniform feed and at the same time provides a gas seal between the interior and the exterior of the furnace. The materials introduced into the furnace while in rotation are spread in a regular layer by a blade 23 and packed by roller 24 weighted by counter weight 25.

Referring now to FIGS. 3 and 3a, the width of annular sole 1 is substantially the same as that of the body of the furnace as defined between the cylindrical walls 5 and 6. A space 30 is provided between sole 1 and the base of the body of the furnace. As shown in these figures, the extraction apparatus for the treated material includes a toothed ratchet wheel 31 located between sole 1 and the body of the furnace and rotated about a vertical axis 32 by any suitable mechanism not shown.

The extracting wheel 31 has a radius greater than the width of sole 1 and its axis of rotation 32 passes inside of the annular surface of sole 1. A chute 33 is located above suitable crushing apparatus, not shown, or above a conveyor to a crusher, not shown, and chute 33 receives the treated material from wheel 31.

In the embodiment of FIGS. 4 and 4a, the relative positions of wheel 31 and chute 33 are reversed from one side of sole 1 to the other.

The structures shown in FIGS. 5, 5a, 6 and 6a provide another means for continuous extraction of the treated material at the base of the body of the furnace by utilizing an eccentric sole. In these embodiments, sole 1 has two annular zones which are eccentric and juxtaposed at different levels. Each is equal in width to the width of the body of the furnace. The high part of the sole is adjacent the base of the body of the furnace. The mean diameter of the sole corresponds to the offset between the two levels. This mean diameter is equal to the mean diameter of the body of the furnace. The distance between the axis of rotation of the sole and the axis of rotation of the body of the furnace is equal to half the width of the body of the furnace.

In the embodiment of FIGS. 5 and 5a, the high part 40 of the sole forms an annular interior zone and the lower part 41 of the sole forms an annular exterior zone.

In the embodiment of FIGS. 6 and 6a, the high part 40 of the sole forms the annular exterior zone and the low part 41 of the sole forms the interior annular zone.

In the preferred embodiments of the present concept as generally described above, the interior annular wall 5 of the furnace may have a diameter of 8 meters while the annular outer wall 6 of the furnace may have diameter of 10 meters providing the furnace with a width of 1 meter along a diameter. The distance from the top of sole 1 to the top of the charge of material 14 in the furnace is about 1 meter.

The materials to be treated are introduced at ambient temperature into the furnace in layers about 150 mm. thick and are a mixture of minerals and coke having a particle size less than 10 mm. The treated materials are removed in layers of about the same thickness and at a temperature below 100° C. Air to support combustion is introduced into the furnace at ambient temperature and the gases produced by combustion are removed at temperatures of about 60° to 70° C. The temperature in the combustion zone is on the order of 1200° C. but this temperature will be determined by the nature of the materials being treated.

In the normal operation of the above-described furnace, the crude materials to be treated are introduced into the furnace by rotary device 22 forming an even layer in the upper part of the furnace while an equal quantity of treated material is removed continuously from the lower part of the furnace. The materials being treated progress slowly from top to bottom during rotation of the furnace and the ducts 13 create a gaseous current from bottom to top through the material being treated.

The amount of feed, the amount of removal of treated material and the amount of gas are regulated so as to maintain the zone of combustion at a substantially constant level in the body of the furnace with the movement of combustion toward the top under the effect of the gaseous current being compensated by the progressive descent of the materials in the furance.

Under these conditions, a drying and preheating zone 45 (FIG. 1) is established from the top toward the bottom of the body of the furnace for the materials to be treated; a zone of combustion 46 is established beneath zone 45; and a cooling zone for the treated materials 47 is provided beneath zone 46. In zone 45, the hot gases coming from the combustion zone pass through the layers of cold material and give up the greatest part of their sensible heat in preheating the materials. In zone 47 the cold gases pass through the layers of material which are still very hot after combustion and are preheated while cooling these materials.

The loss of sensible heat by the fumes removed from the furnace or by the removed treated materials is therefore reduced to a minimum.

The treated material arriving on the sole at the lower part of the furnace is a compact agglomerate. In the embodimnts of FIGS. 3, 3a, 4 and 4a, this agglomerate is broken by the toothed wheel 31 acting as a cutter with the material advanced into the cutter by the rotation of the furnace. The treated material is removed by cutter 31 and falls into chute 33 and may then be crushed.

Downstream of wheel 31 the space left by the removed treated materials is filled by the descent of a new mass of material which will be removed during the next rotation of the furnace.

When the treated material is removed from the furnace using an eccentric sole, such as is shown in FIGS. 5 and 5a, it will be noted, with reference to zones 50 and 51 which are diametrically opposed on the line of the centers of rotation of the sole and of the body of the furnace, that at 50 the lower part 41 of the sole is below the body of the furnace while at 51 the high part of sole is below the body of the furnace. Considering a portion 54 of the lower layer of material located in zone 50, this portion rests on the low part 41 of the sole. In the rotation of the sole and of the body of the furnace in the direction of the arrow (FIG. 5a), the relative movement of the sole and of the body of the furnace produces a progressive introduction of the high part of the sole under the furnace pushing the materials toward the outside. The portion of materials 54 is moved by the sole and is pushed toward the exterior of the furnace by the wall between the two levels and arrives, successively, at 55 and 56 after a rotation of the sole through 90° and 180°. At 56 portion 54 is entirely outside of the body of the furnace and is engaged by rake 57 and falls into chute 33.

In the second part of a complete rotation of the furnace and sole, the relative movement of the sole and of the body of the furnace provides a progressive withdrawal of the high part of the sole and the materials in the body of the furnace progressively fall on the low part of the sole until, again, in the zone 50, the body of the furnace in its entire width is located above the low part of the sole.

In the embodiment of FIGS. 6 and 6a, removal of the treated material is analogous to that of FIGS. 5 and 5a and the treated material is discharged toward the interior of the rotary furnace.

Changes in or modifications to the above-described illustrative embodiments of the present concept may now be suggested to those skilled in the art without departing from the present inventive concept. Reference should therefore be had to the appended claims to determine the scope of this invention.

What is claimed is:

1. An annular rotary furnace for the continuous treatment of pulverized or granular materials comprising an annular sole rotated about a vertical axis, an annular body for the furnace having spaced substantially cylindrical walls disposed above said sole and rotated around a vertical axis in synchronism with said sole, a fixed annular cap connected to said body of the furnace by a gas tight joint, means in said cap for charging the raw material to be treated into the furnace, means for providing an ascending circulation of gases through the material in said body of the furnace and means for removal of treated materials between said body of the furnace and said sole.

2. A rotary furnace as described in claim 1, said means for removal of treated materials including a toothed ratchet wheel rotating on a vertical axis exterior of said annular sole and mounted between the body of the furnace and said sole across the width of said sole.

3. A rotary furnace as described in claim 1, said means for removal of treated materials including two eccentric superposed levels on said sole, the upper of said levels passing close to the bottom of the body of the furnace, a rake bearing on the lower of said levels, said sole having the same mean radius as that of said body of the furnace and double the width of said body, said two levels forming two annular concentric zones one above the other and of the same width, the axes of rotation of said sole and of the body of the furnace being spaced apart a distance equal to half the width of the body of the furnace.

References Cited

UNITED STATES PATENTS

| 3,365,339 | 1/1968 | Beggs et al. | 75—3 |
| 3,370,937 | 2/1968 | Tsujihata et al. | 75—5 |
| 3,452,972 | 7/1969 | Beggs | 266—20 |
| 3,460,818 | 8/1969 | Greaves et al. | 266—21 |

GERALD A. DOST, Primary Examiner

U.S. Cl. X.R.

75—3